United States Patent
Shinzato et al.

(10) Patent No.: US 8,787,998 B2
(45) Date of Patent: Jul. 22, 2014

(54) SUPERCONDUCTING COIL APPARATUS, SUPERCONDUCTING APPATATUS, AND METHOD OF MAKING SUPERCONDUCTING COIL APPARATUS

(75) Inventors: Tsuyoshi Shinzato, Osaka (JP); Hitoshi Oyama, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 335 days.

(21) Appl. No.: 13/266,844

(22) PCT Filed: Jul. 7, 2010

(86) PCT No.: PCT/JP2010/061508
§ 371 (c)(1),
(2), (4) Date: Oct. 28, 2011

(87) PCT Pub. No.: WO2011/083592
PCT Pub. Date: Jul. 14, 2011

(65) Prior Publication Data
US 2012/0053060 A1    Mar. 1, 2012

(30) Foreign Application Priority Data

Jan. 8, 2010  (JP) ................................ 2010-002922

(51) Int. Cl.
*H01L 39/04*      (2006.01)
*H01F 6/06*       (2006.01)
*H02K 55/04*      (2006.01)
*F17C 3/08*       (2006.01)
*F17C 13/00*      (2006.01)

(52) U.S. Cl.
CPC ................ *H01F 6/06* (2013.01); *H02K 55/04* (2013.01); *F17C 13/00* (2013.01); *Y02E 40/625* (2013.01); *Y10S 505/876* (2013.01); *Y10S 505/879* (2013.01); *Y10S 505/888* (2013.01)
USPC ........... 505/163; 505/211; 505/166; 505/876; 505/879; 505/888; 335/216; 29/599; 174/125.1; 62/51.1

(58) Field of Classification Search
CPC .......... H01L 39/04; H01L 39/24; H01F 6/06; H02K 55/00; H02K 55/04; H05K 55/04; F17C 3/085; F17C 13/007; H01B 12/02
USPC ......... 505/163, 166, 211, 434, 878, 879, 845, 505/888; 29/599; 174/125.1, 50; 324/328, 324/319; 335/216; 62/51.1; 310/40 R, 52
See application file for complete search history.

(56) References Cited

U.S. PATENT DOCUMENTS

| 4,862,023 A | 8/1989 | Laumond et al. |
| 6,794,792 B2 * | 9/2004 | Wang ............................ 310/270 |
| 8,229,527 B2 * | 7/2012 | Le Feuvre et al. ............ 505/163 |

FOREIGN PATENT DOCUMENTS

| CN | 101425741 A | 5/2009 |
| JP | S59-72951 A | 4/1984 |

(Continued)

*Primary Examiner* — Stanley Silverman
*Assistant Examiner* — Kallambella Vijayakumar
(74) *Attorney, Agent, or Firm* — Drinker Biddle & Reath LLP (57) ABSTRACT

A superconducting coil apparatus and a superconducting apparatus including the superconducting coil apparatus are provided. The superconducting coil apparatus includes a superconducting coil 10, an inner container 50 that holds the superconducting coil 10 therein, and an outer container 60. The inner container 50 and the outer container 60 are made of FRP. At a corner portion 71 of the inner container 50 and the outer container 60, a sealing reinforcement portion 2 made of a resin is formed so as to extend along the corner portion 71. Opening portions 53 and 63 are formed in side surfaces of the inner container 50 and the outer container 60. The sealing reinforcement portion 2 is disposed at the corner portion 71 of the opening portions 53 and 63, whereby the sealing performance of the container can be improved.

10 Claims, 10 Drawing Sheets

(56) References Cited

FOREIGN PATENT DOCUMENTS

| | | | | |
|---|---|---|---|---|
| JP | 61-85107 | 6/1986 | | |
| JP | 61085107 | * 6/1986 | ................ | H01F 6/00 |
| JP | H08-78226 A | 3/1996 | | |
| JP | H09-308222 A | 11/1997 | | |
| JP | 2007-35835 | 2/2007 | | |
| JP | 2007035835 | * 2/2007 | .............. | H01L 39/04 |
| JP | WO 2007032472 | * 3/2007 | .............. | H02K 55/02 |
| JP | 2007-210325 A | 8/2007 | | |
| JP | 2008-218861 A | 9/2008 | | |
| JP | 2009-124886 A | 4/2009 | | |
| JP | 2009170724 | * 7/2009 | .............. | H01L 39/04 |
| JP | 2010-4646 A | 1/2010 | | |
| WO | 2007/032472 | 3/2007 | | |

* cited by examiner

SUPERCONDUCTING COIL APPARATUS, SUPERCONDUCTING APPATATUS, AND METHOD OF MAKING SUPERCONDUCTING COIL APPARATUS

TECHNICAL FIELD

The present invention relates to a superconducting coil apparatus and a superconducting apparatus, and in particular, to a superconducting coil apparatus including a container that contains a superconducting coil therein and to a superconducting apparatus including the superconducting coil. The present invention also relates to a method of making the superconducting coil apparatus.

BACKGROUND ART

A superconducting coil formed by helically winding a superconducting wire is used in a very low temperature. Therefore, in a superconducting apparatus including a superconducting coil, such as a motor, the superconducting coil is used while being held in a container. The superconducting coil is used in a cooled state by supplying a coolant such as liquid nitrogen into the container.

Japanese Unexamined Patent Application Publication No. 2007-35835 (Patent Document 1), for example, describes an existing method of making an inner container of a cryostat for storing a coolant having a very low temperature and holding a superconducting coil therein.

SUMMARY OF INVENTION

Technical Problem

The method of making the cryostat described in Japanese Unexamined Patent Application Publication No. 2007-35835 is as follows. First, a frame body made of a fiber-reinforced plastic (FRP) is prepared. FRP is a reinforced material made by impregnating reinforcing fiber, such as glass fiber or carbon fiber, with a thermosetting resin and heat-curing the thermosetting resin. Uncured substances called prepregs, which are made of a material similar to FRP, are affixed to the frame body. Then, the frame body, to which the prepregs have been affixed, is heat-cured and thereby the prepregs are formed as side surfaces of the container. Thus, the inner container of the cryostat is formed.

It is required that a container for holding a coolant having a very low temperature, such as a cryostat, be made of a material that is resistant to thermal expansion and thermal contraction due to a heat cycle between room temperature and the very low temperature. A resin without reinforcing fiber is not strong enough to withstand such a heat cycle. Therefore, it is preferable that the container be made of a fiber-reinforced resin such as FRP. In addition, by using a nonconducting substance such as FRP as the material of the container, occurrence of a phenomenon that the coolant in the container is heated due to Joule heat generated when an electric current flows through the container is suppressed.

However, when a method of affixing the prepregs in layers to the outside of the frame body, such as the method described in Japanese Unexamined Patent Application Publication No. 2007-35835, is used, the prepregs that are being affixed cannot follow a stepped shape of the frame body, in particular in a region of the frame body having a stepped structure. Accordingly, a gap is formed between the prepregs and the frame body in particular in the vicinity of a corner portion of frame body formed by steps of the frame body. Air or the like easily accumulates in the gap, and when the container having the gap is subjected to a heat cycle, the accumulated air applies a thermal stress to a surrounding part of the housing. As a result, a breakage failure, such as a crack that develops from the corner portion, may be generated in the container.

The present invention has been achieved with consideration of the problem described above. An object of the present invention is to provide a superconducting coil apparatus including a container for a superconducting coil with which the sealing performance can be improved by improving the filling accuracy between a frame body of the container and a resin material that forms a side surface of the container, and to provide a superconducting apparatus including the superconducting coil apparatus.

Solution to Problem

A superconducting coil apparatus according to the present invention includes a superconducting coil and a container that holds the superconducting coil therein. The container is made of FRP, and a sealing reinforcement portion made of a resin is formed at a corner portion of the container so as to extend along the corner portion.

Advantageous Effects of Invention

In the superconducting coil apparatus according to the present invention, corner portions (which may be an "edge" that has a convex shape when seen from a direction in which impregnation with a resin is performed or a "corner" that has a concave shape when seen from a direction in which impregnation with a resin is performed) of the container that holds the superconducting coil therein are filled with the sealing reinforcement portions. Thus, generation of a gap in a joint between members of the container, such as the corner portion, is suppressed. Therefore, the sealing performance of the container can be improved. Moreover, even when the container is subjected to a heat cycle, a breakage failure of the container due to generation of a large thermal stress in a gap at a corner portion can be suppressed.

DESCRIPTION OF EMBODIMENTS

Hereinafter, embodiments of the present invention will be described with reference to the drawings. In the embodiments, elements having the same function will be denoted by the same numerals and description thereof will be omitted unless it is necessary. The dimensional ratios in the drawings are not necessarily same as those of the description.

Figure 1:
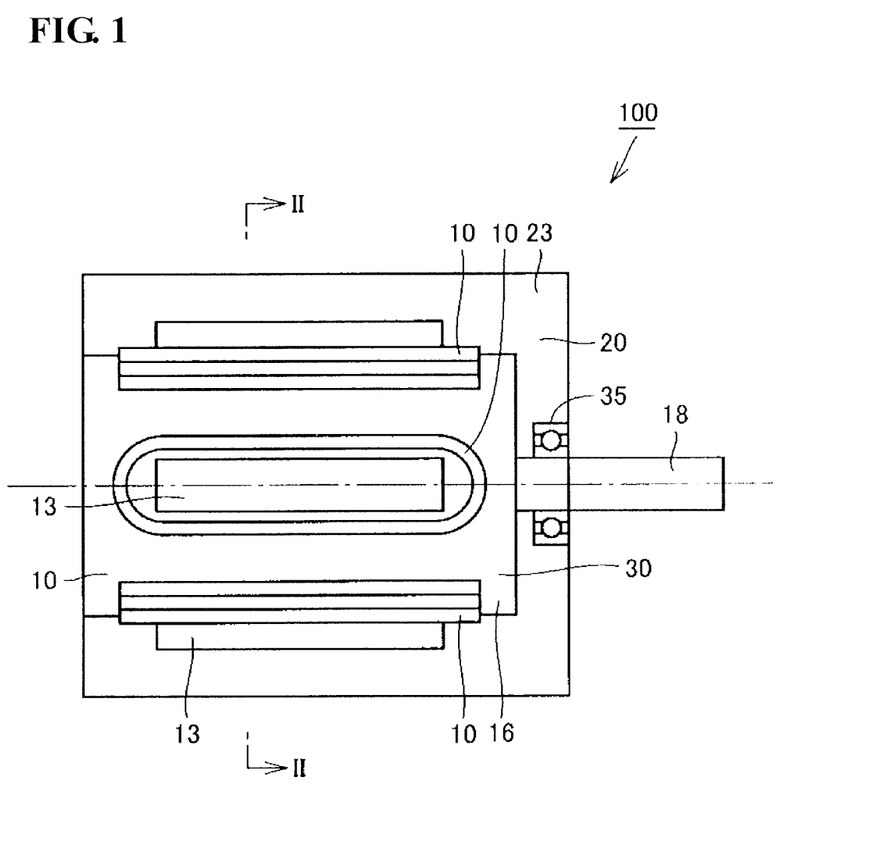
FIG. 1 is a schematic view of a superconducting apparatus according to an embodiment of the present invention.

A superconducting motor 100 illustrated in FIG. 1 is an example of a superconducting apparatus according to an embodiment. The superconducting motor 100 includes a rotor 30 used as a rotor and a stator 20 used as a stator. FIG. 1 is a schematic view of the superconducting motor 100. For convenience of drawing, only some of the components of the rotor 30 are illustrated and the components of the stator 20 are omitted. The components of the rotor 30 and the stator 20 are illustrated in more detail in FIG. 2, which is a sectional view, and in FIGS. 3 to 6. Hereinafter, referring to FIGS. 1 to 6, the superconducting motor 100 will be described.

Figure 3:
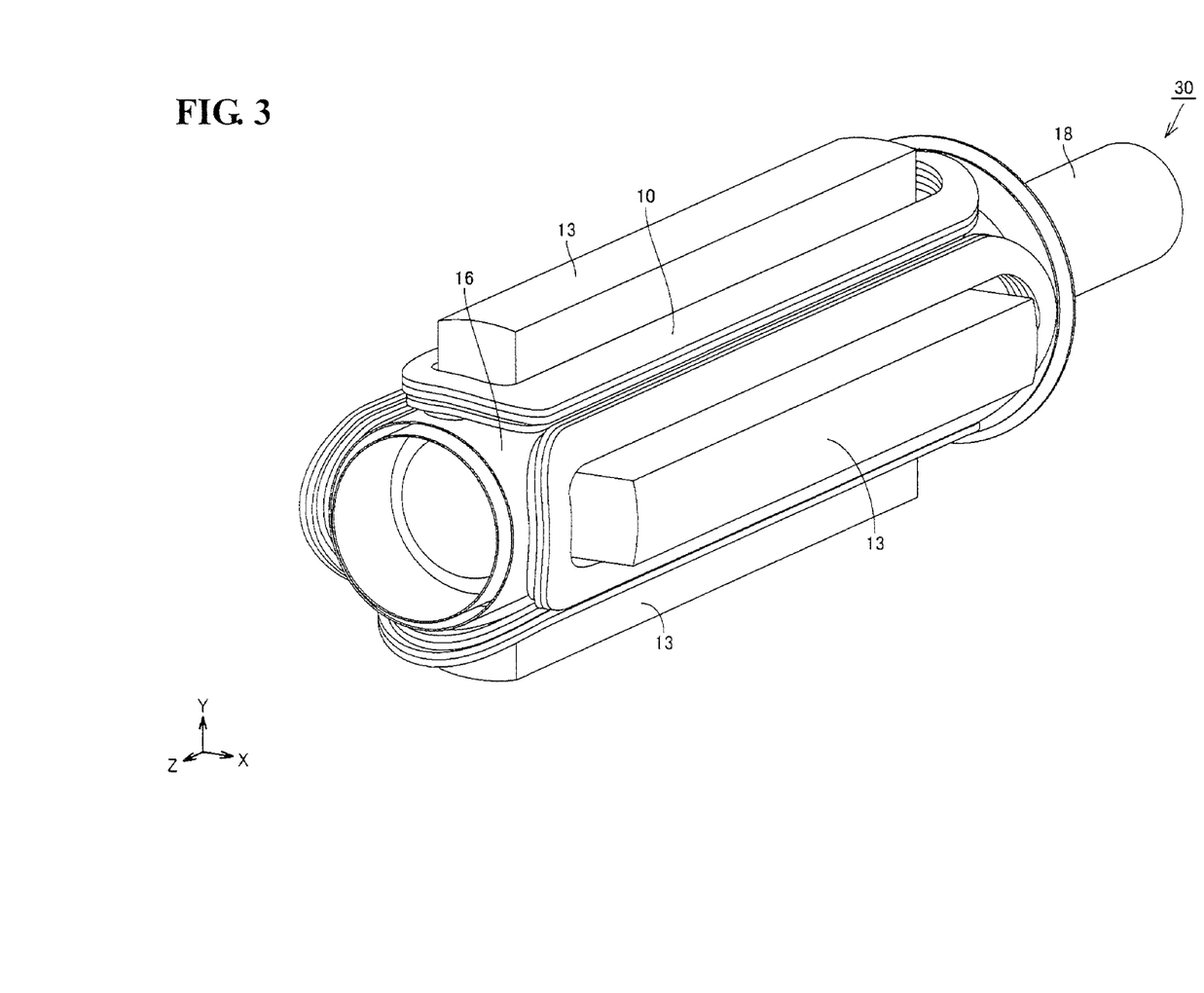
FIG. 3 is a schematic perspective view of the rotor of FIGS. 1 and 2.
Figure 4:
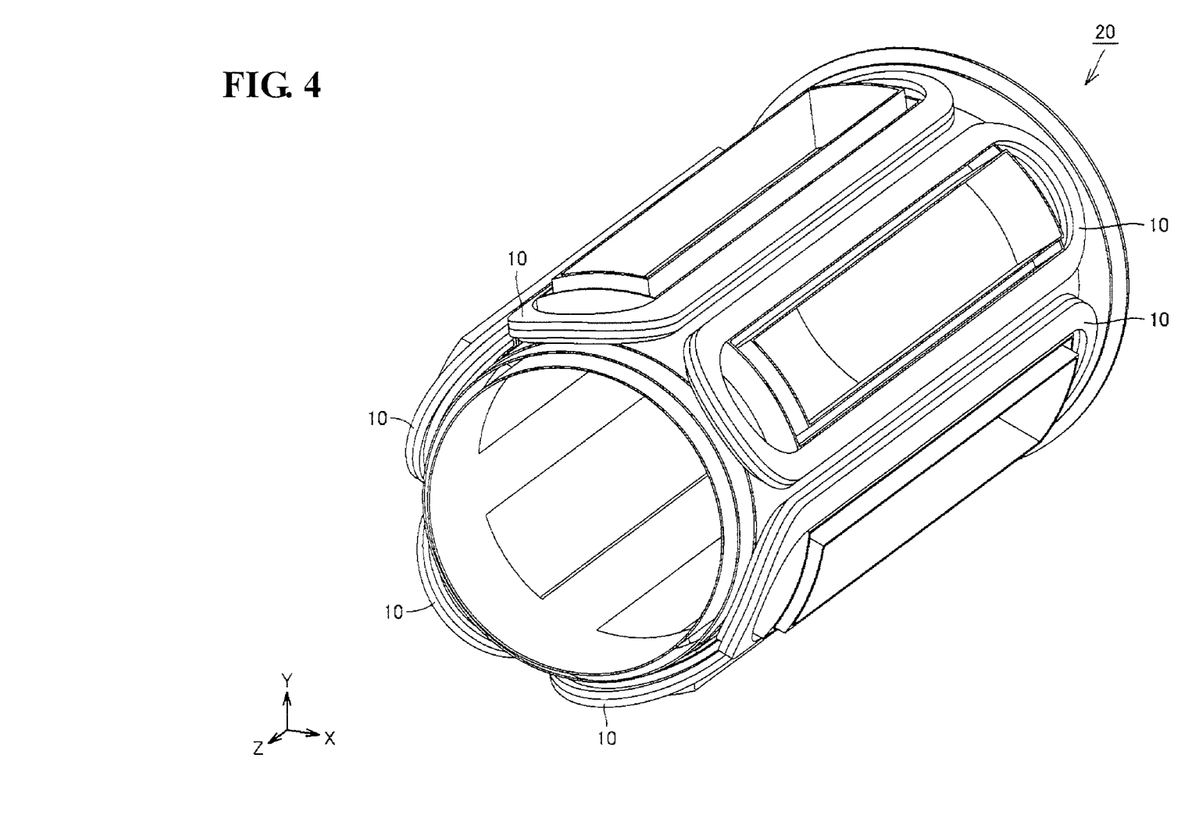
FIG. 4 is a schematic perspective view of the stator of FIGS. 1 and 2.

The rotor 30 of the superconducting motor 100 includes rotor cores 13 and superconducting coils 10 that are superconducting wires helically wound around the rotor cores 13. Electric currents are supplied to the superconducting coils 10 from the outside, thereby generating magnetism in the rotor cores 13 in accordance with the directions of the electric currents. It is preferable that the superconducting coils 10 be race track coils as illustrated in FIGS. 1, 3, and 4. Regarding the stator 20, magnetism is generated in stator cores 23 in accordance with the directions of electric currents that flow through the superconducting coils 10 wound around the stator cores 23. The rotor 30 is rotated around a rotor shaft 16 by using attraction and repulsion between the magnetism of the rotor cores 13 and the magnetism of the stator cores 23. Rotation of the rotor 30 is transmitted to the outside through an output shaft 18 connected to a load to which the rotation of the rotor 30 is output. The output shaft 18 is rotatably supported by a bearing 35.

Because each superconducting coil 10 is formed of a superconducting wire, it is necessary to cool the superconducting coil 10 with a coolant 17, such as liquid nitrogen, to operate the superconducting coil 10. Therefore, the superconducting coil 10 is held in a container. The container is filled with the coolant 17, whereby the superconducting coil 10 is cooled and becomes operable.

Figure 2:
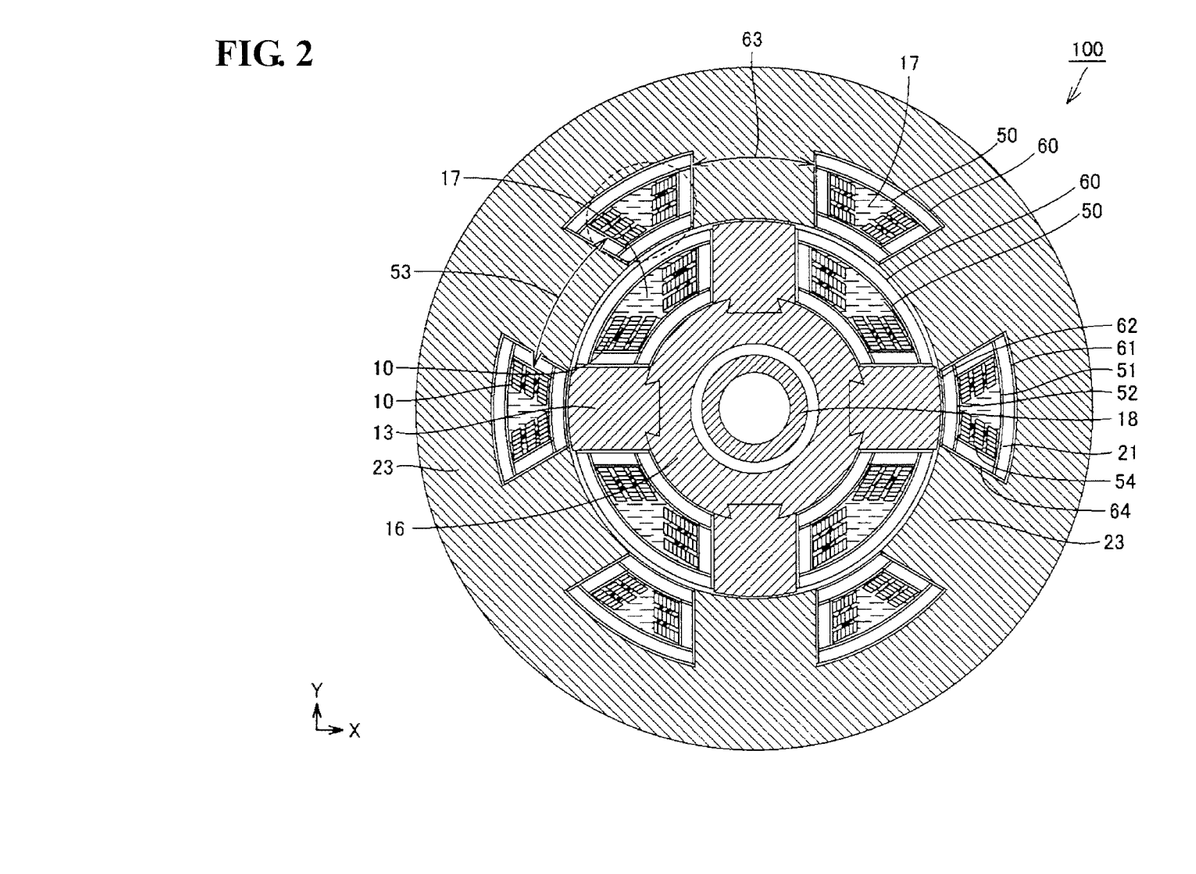
FIG. 2 is a schematic sectional view taken along line II-II of FIG. 1.

Here, the container is a superconducting coil container for housing the superconducting coil 10. As illustrated in FIG. 2, each superconducting coil container includes an inner container 50, which directly holds the superconducting coil 10 therein, and an outer container 60, which is disposed so as to surround the outer periphery of the inner container 50. A superconducting coil apparatus is constituted by the superconducting coil 10, the inner container 50 holding the superconducting coil 10 therein, and the outer container 60 surrounding the outer periphery of the inner container 50. The inner container 50 and the outer container 60 are provided to each of the superconducting coils 10 of the rotor 30 and the stator 20. Note that the inner container 50 and the outer container 60 are not illustrated in FIGS. 1, 3, and 4.

Because the container has the inner container 50, the superconducting coil 10 can be cooled and stably operated. Because the container has the outer container 60, the container serves as a heat-insulating container by preventing the inner container 50, which holds a coolant therein, from contacting the outside air having room temperature.

Therefore, it is preferable that the inner container 50 and the outer container 60 be made of a material having good heat insulating properties. For example, it is preferable that they may be made of fiber-reinforced plastics (FRP). Because FRP has very high strength and heat insulating properties, FRP can suppress a temperature difference between the inside and outside of the container, a breakage failure due to a thermal stress caused by a temperature difference in the container between a time when the superconducting motor 100 is operating and a time when the superconducting is not operating, and a reduction in the efficiency in cooling the superconducting coil 10 with the coolant. However, instead of FRP, the inner container 50 and the outer container 60 may be made of a plastic containing an inorganic filler, or a ceramic.

Figure 5:
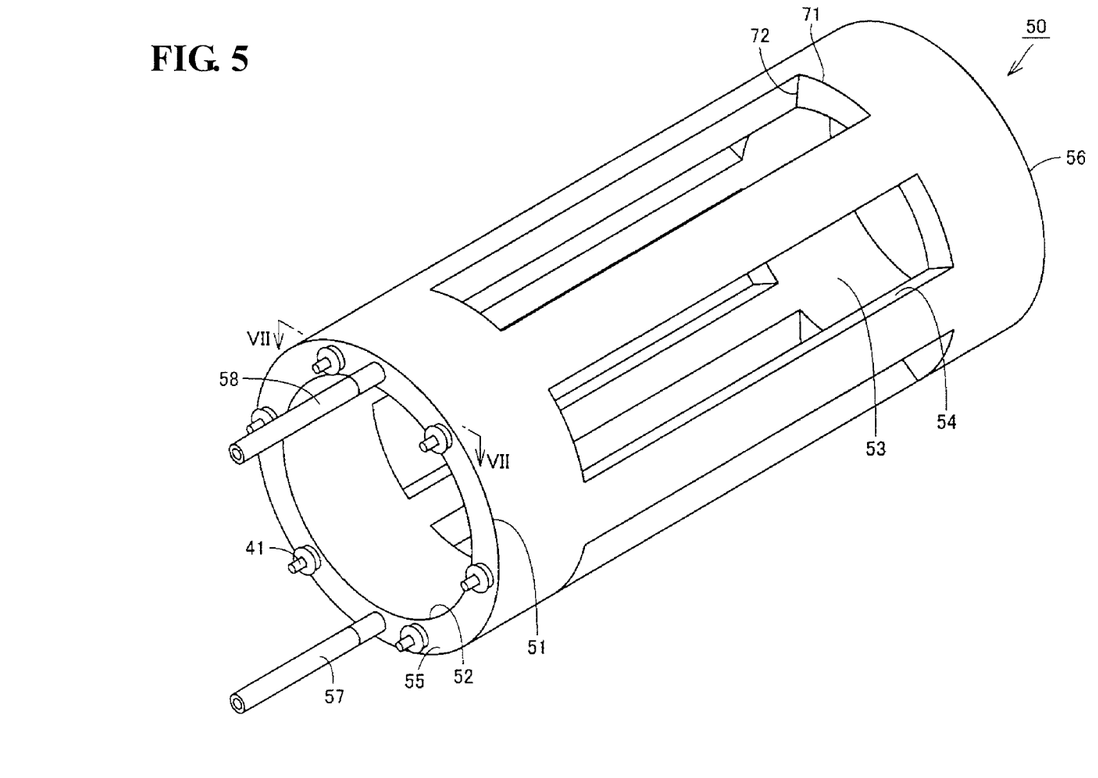
FIG. 5 is a schematic perspective view illustrating the structure of an inner container that holds a superconducting coil therein.
Figure 6:
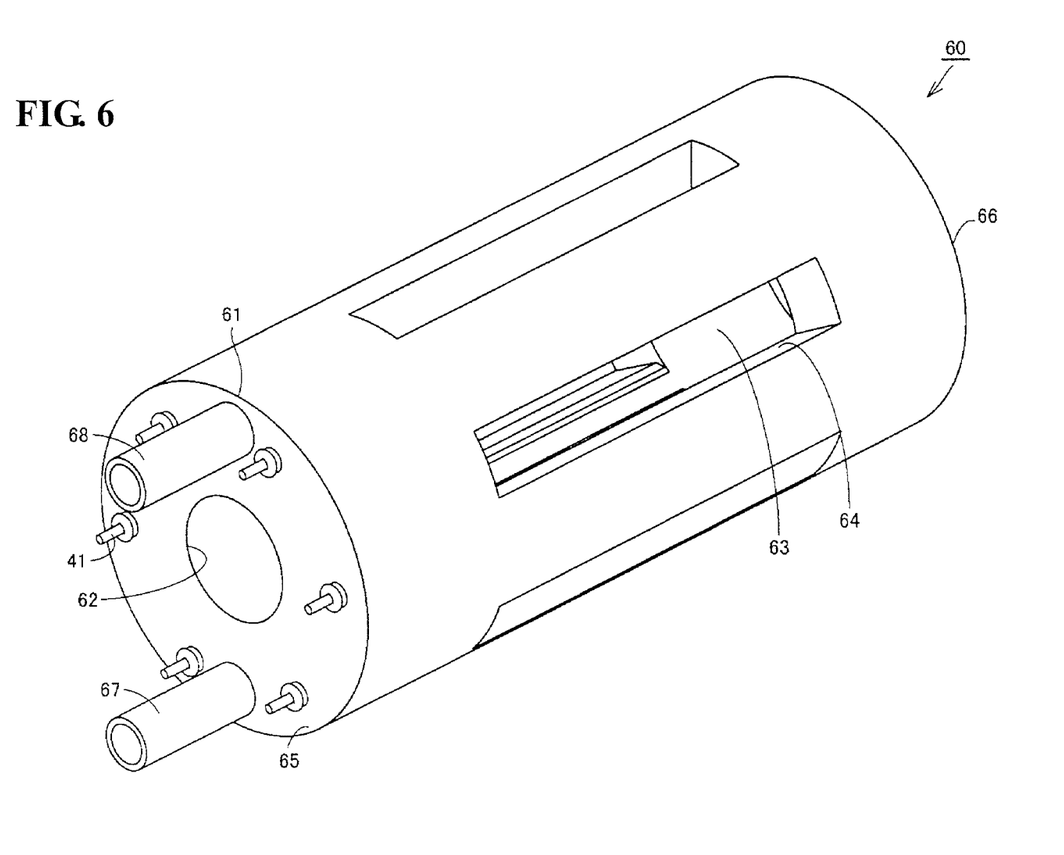
FIG. 6 is a schematic perspective view illustrating the structure of an outer container that surrounds the inner container of FIG. 5.

FIGS. 5 and 6 illustrate an example of an inner container and an example of an outer container used for the stator 20. As illustrated in FIG. 5, the inner container 50 includes an FRP housing having, for example, a cylindrical shape. In the cylindrical portion of the inner container 50, two cylindrical housings, which are an inner container outer housing 51 and an inner container inner housing 52, are disposed such that the centers of the circular bottom surfaces thereof substantially coincide with each other and form substantially concentric circles. The superconducting coils 10 are placed in regions between the inner container outer housing 51 and the inner container inner housing 52. In order to allow the stator cores 23 and the rotor cores 13 to extend through hollow regions in the superconducting coils 10, opening portions 53 are formed in side surfaces (cylindrical side portions) of the inner container outer housing 51 and the inner container inner housing 52. That is, the hollow regions of the superconducting coils 10, the stator cores 23, and the rotor cores 13 are disposed in the opening portions 53. The superconducting wires of adjacent superconducting coils 10 are disposed in regions between adjacent opening portions 53.

As illustrated in FIG. 5, each opening portion 53 may be formed so as to extend from the inner container outer housing 51 to the inner container inner housing 52 in a direction that intersects the side surfaces of the inner container outer housing 51 and the inner container inner housing 52 by forming, for example, rectangular holes in the side surfaces. However, for example, the opening portion 53 may be formed as a recessed portion when seen from the outside (inside) of the side surface of the inner container 50 by forming a rectangular hole in only one of the inner container outer housing 51 and the inner container inner housing 52.

An opening portion side surface 54, which is made of FRP, closes sides of the opening portion 53. End housings 55 and 56, each having a flange-shape and being made of FRP, are disposed in the vicinities of the bottom surfaces (the ends of the cylindrical shape) of the inner container outer housing 51 and the inner container inner housing 52. Thus, a region between the inner container outer housing 51 and the inner container inner housing 52 becomes an enclosed space, whereby the inner container 50 is formed. A coolant supply pipe and a coolant outlet pipe for supplying and draining the coolant 17 (see FIG. 2), such as liquid nitrogen, are connected to this region. As illustrated in FIG. 5, two tubular members for distributing the coolant protrude from the end housing 55. One of the tubular members (tubular member 57) is the coolant supply pipe for supplying the coolant 17 into the inner container 50, and the other of the tubular members (tubular member 58) is a coolant outlet pipe for draining the coolant 17 from the inside of the inner container 50. Because the tubular members have the same structure, both will be collectively referred to as coolant supply pipes.

The outer container 60, which serves as a heat-insulating container, is disposed so as to surround the inner container 50 as described above. To be specific, as illustrated in FIG. 2, an outer container outer housing 61 is placed outside the inner container outer housing 51 of the inner container 50 so as to face the inner container outer housing 51, and an outer container inner housing 62 is placed inside the inner container inner housing 52 so as to face the inner container inner housing 52. The inner container 50 is placed in a region between the outer container outer housing 61 and the outer container inner housing 62 (that is, inside the outer container 60). As illustrated in FIG. 6, opening portions 63 are formed in the outer container outer housing 61 and the outer container inner housing 62 so as to overlap the opening portions 53. The hollow regions of the superconducting coils 10, the stator cores 23, and the rotor cores 13 are disposed in regions in which the opening portions 63 and the opening portions 53 overlap (see FIG. 2). An opening portion side surface 64 is formed on sides of each opening portion 63 and end housings 65 and 66 are provided, whereby the inside of the outer container 60 forms an enclosed space.

That is, the diameters of the circular bottom surfaces of the containers decrease in the following order: the outer container outer housing 61, the inner container outer housing 51, the inner container inner housing 52, and the outer container inner housing 62. The opening portions 63 are smaller than the opening portions 53.

The inner container 50 and the outer container 60 are disposed so that they do not contact each other with respect to the radial direction of the circular bottom surfaces thereof. That is, as illustrated in FIG. 2, there is a certain gap between the inner container outer housing 51 of the inner container 50 and the outer container outer housing 61 of the outer container 60. The same is true for the inner container inner housing 52 of the inner container 50 and the outer container inner housing 62 of the outer container 60. That is, the gap exists as, for example, a gap 21 illustrated FIG. 2 and surrounds the outer periphery of the inner container 50. Due to the presence of the gap 21, the efficiency in cooling the inside of the inner container 50 with the coolant 17 is increased, and the temperature inside the inner container 50 is restrained from being influenced by room temperature outside the outer container 60. Therefore, the outer container 60 serves as a heat-insulating member for facilitating control of the temperature inside the inner container 50.

An outer tube illustrated in FIG. 6 is disposed on the outer container 60 so as to cover the tubular member 57. An outer tube 68 illustrated in FIG. 6 is disposed on the outer container 60 so as to cover the tubular member 58. The two outer tubes protrude from the end housing 65 as with the tubular members 57 and 58. One of the outer tubes surrounds the tubular member 57 for supplying the coolant 17 into the inner container 50, and the other of the outer tubes surrounds the tubular member 58 for draining the coolant 17 from the inside of the inner container 50. The outer tube that surrounds the tubular member 57 will be referred to as an outer tube 67, and the outer tube that surrounds the tubular member 58 will be referred to as the outer tube 68. Here, both will be referred to as outer tubes.

As illustrated in FIG. 6, as with the opening portions 53, each opening portion 63 may be formed so as to extend from the outer container outer housing 61 to the outer container inner housing 62 in a direction that intersects the side surfaces of the outer container outer housing 61 and the outer container inner housing 62 by forming, for example, rectangular holes in the side surfaces. However, for example, the opening portion 63 may be formed as a recessed portion when seen from the outside (inside) of the side surface of the outer container 60 by forming a rectangular hole in only one of the outer container outer housing 61 and the outer container inner housing 62.

Figure 7:
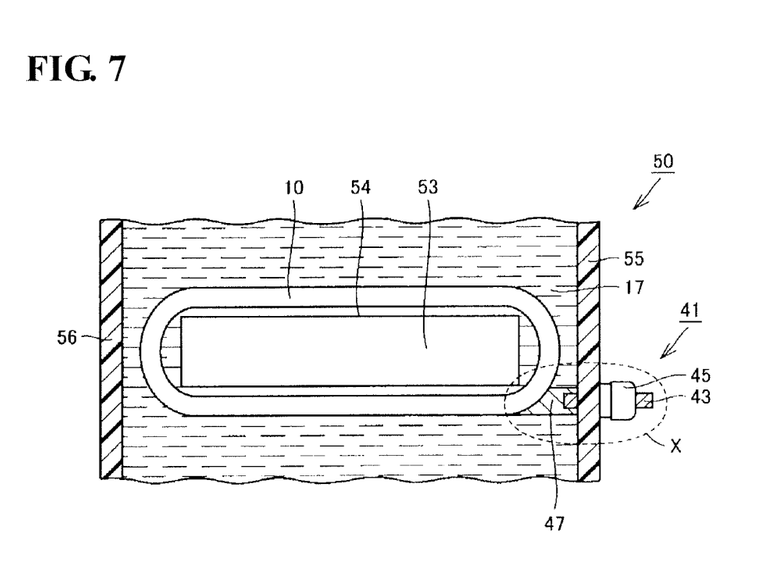
FIG. 7 is a schematic sectional view taken along line VII-VII of FIG. 5.

As described above, the superconducting coil 10 is placed in the inner container 50 illustrated in FIGS. 2 and 5. The configuration is illustrated in the sectional view of FIG. 7. A terminal for supplying an electric current to the superconducting wire of the superconducting coil 10 is connected to the superconducting coil 10. The configuration is illustrated in FIG. 7. A terminal 41 includes a housing fixed terminal 43, a terminal component 45, and a wire fixing terminal 47. In FIG. 7, the terminal 41 is composed of three members, which are the housing fixed terminal 43, the terminal component 45, and the wire fixing terminal 47, for ease of manufacturing. However, the terminal 41 may be composed of a single member.

Figure 8:
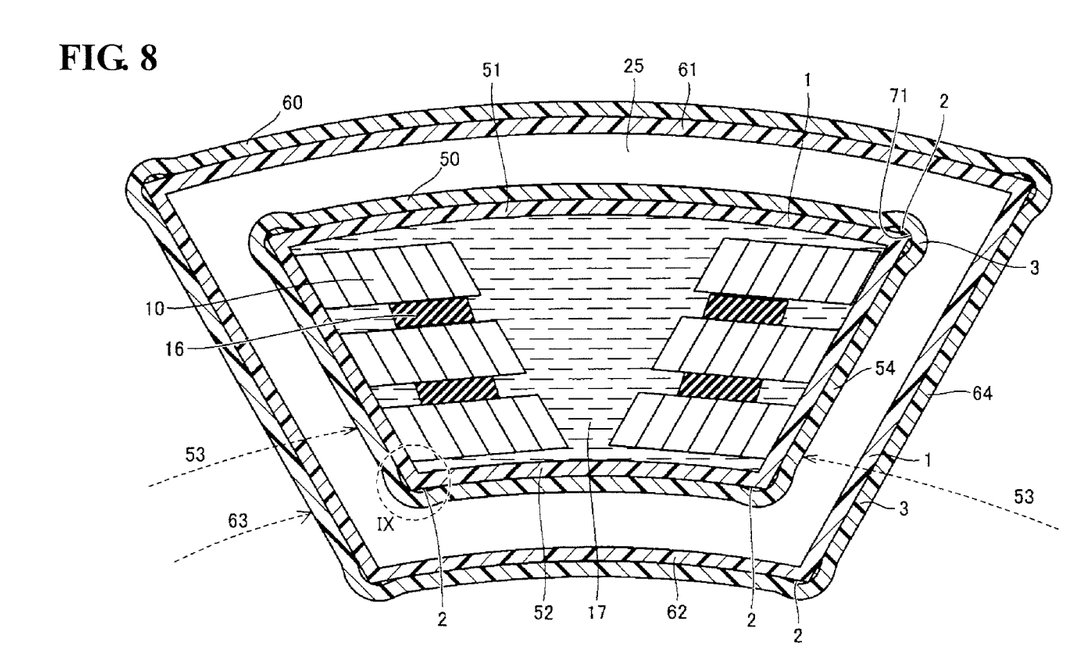
FIG. 8 is a detailed enlarged view of a part of FIG. 2 illustrating the inside of the inner container and the outer container.

As illustrated in FIG. 8, the inner container outer housing 51 and the inner container inner housing 52 of the inner container 50 each include a base body 1 and a reinforcing fiber 3 that is disposed so as to surround the outer periphery of the base body 1. The same is true for the outer container outer housing 61 and the outer container inner housing 62 of the outer container 60.

Because the base body 1 is a frame body of the inner container 50 and the outer container 60, it is preferable that the base body 1 be made of FRP, a plastic containing an inorganic filler, or a ceramic, from which the inner container 50 and the outer container 60 are made as described above.

To reinforce the connection between the members of the base body 1 having a container-like shape, the reinforcing fiber 3 is disposed so as to cover the entire surface of the base body 1 (so as to wrap the entire surface of the base body 1). The reinforcing fiber 3 is made of, for example, a material composed of a reinforcing material, such as a glass fiber (glass cloth or the like) or a carbon fiber, that is impregnated with a thermosetting resin, such as an epoxy resin or an unsaturated polyester resin. That is, the reinforcing fiber 3 is made of, for example, FRP as with the base body 1.

Sealing reinforcement portions 2 are formed at edges 71 of the base body 1. The edges 71 illustrated in FIGS. 8 and 5 and corners 72 illustrated in FIG. 5 will be collectively referred to as corner portions. Each edge 71 is a place where a joint between members of the base body 1 is bent so as to form a convex shape when seen from the outside of the inner container 50 and the outer container 60. Each corner 72 is a place where a joint between members of the base body 1 is bent so as to form a concave shape when seen from the outside of the inner container 50 and the outer container 60.

Sealing reinforcement portions 2 are made of a resin material the same as that of the thermosetting resin included in the reinforcing fiber 3. The sealing reinforcement portions 2 are disposed so as to extend in a direction in which the edges 71 and the corners 72 (corner portions) of the base body 1 extend (the direction perpendicular to the plane of FIG. 8). That is, the sealing reinforcement portions 2 are disposed so as to cover the extending edges 71 and corner 72 from the outside of the inner container 50 and the outer container 60.

Figure 9:
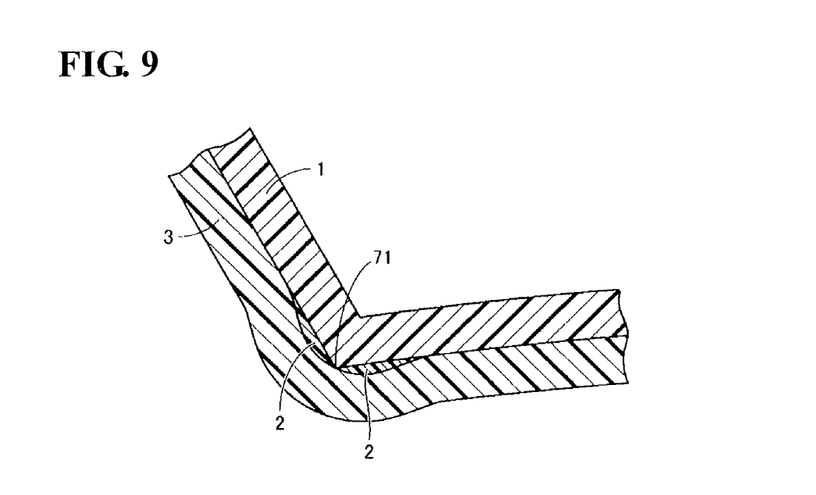
FIG. 9 is a schematic enlarged view of a region surrounded by a dotted circle "IX" in FIG. 8.

As illustrated in FIG. 9, the reinforcing fiber 3 is disposed so as to cover the outer periphery of the base body 1 of the inner container 50. The reinforcing fiber 3, which is a sheet-like member, is disposed so as to closely contact the surface of the base body 1. Thus, the reinforcing fiber 3 and the base body 1 are integrated with each other, whereby the surfaces of the inner container 50 and the outer container 60 are provided with a strength that is resistant to, in particular, a thermal stress due to the heat cycle between room temperature and a very low temperature. This is owing to the reinforcing material of the reinforcing fiber 3, such as a glass fiber material or a carbon fiber.

However, the reinforcing fiber 3 may not closely contact the surface of the base body 1, and thereby a gap may be formed between the base body 1 and the reinforcing fiber 3, for example, in the vicinity of the edge 71 of a joint of a member extending in the vertical direction in FIG. 9 and a member extending in the horizontal direction in FIG. 9. This is because, when wrapping the surface of the base body 1 with the reinforcing fiber 3, it is difficult for the reinforcing fiber 3 to be deformed at the edge 71 so as to follow the surface shape of the base body 1 (a substantially right-angled intersection shape). That is, as illustrated in FIG. 9, the reinforcing fiber 3 in the vicinity of the edge 71 is curved at a relatively rounded angle as compared with the edge 71 of the base body 1. Therefore, a gap is easily formed between the curved portion of the reinforcing fiber 3 and the edge 71 of the base body 1.

Because a corner portion such as the edge 71 is a joint of a plurality of members, a gap may be formed at the joint if the members are not properly joined to each other. Such a gap is often generated when the bonding strength between the members at the joint is insufficient. If a gap is generated at the edge 71 and the reinforcing fiber 3 is disposed without closely contacting the gap, a hole that extends from the inside to the outside of the inner container 50 and the outer container 60 may be formed at the gap.

When such a hole is formed, the sealing performance of the inner spaces of the inner container 50 and the outer container 60 is reduced. To be specific, the coolant 17 (see FIG. 2) for cooling the superconducting coil 10 held in the inner container 50 may leak to the outside of the inner container 50. When a small leakage of a gas, such as air, between the inside and the outside of the outer container 60 occurs, it becomes difficult to maintain a vacuum state inside the outer container 60. That is, the heat insulating properties of the outer container 60 for the inner container 50 may be reduced, and the efficiency of cooling the inside of the inner container 50 with the coolant 17 may be reduced.

The sealing reinforcement portion 2 is disposed so as to cover the hole even if such a hole described above is formed at the corner portion. That is, the sealing reinforcement portion 2 improves the sealing performances of the inner container 50 and the outer container 60 by closing the hole at the corner portion. When the hole is closed by the sealing reinforcement portion 2, leakage of a gas or the coolant between the inside and the outside of the inner container 50 and the outer container 60 is suppressed, whereby the performance of the superconducting coil 10 can be increased.

When the gap between the base body 1 and the reinforcing fiber 3 is filled with the sealing reinforcement portion 2, which is made of a resin, the probability that a gas such as air is retained in a region between the base body 1 and the reinforcing fiber 3 can be reduced. If air is retained between the base body 1 and the reinforcing fiber 3 so as to extend along the edge 71, a crack may be generated due to a thermal stress at a joint between the members of the base body 1 and the crack may develop, whereby the probability that the base body 1 suffers from a breakage failure is increased. In contrast, if the region between the base body 1 and the reinforcing fiber 3 is filled with a resin material (sealing reinforcement portion 2), even if a crack is formed at the joint between the members of the base body 1, the crack is easily covered by the sealing reinforcement portion 2 (the inside of the crack is filled with the sealing reinforcement portion 2), so that the probability that the crack develops and the base body 1 suffers from a breakage failure is reduced.

As described above and as illustrated in FIG. 8, the sealing reinforcement portions 2 are formed at the corner portions (edges 71) of the opening portion 53 in the side surface of the inner container 50 (the opening portion 63 in the side surface of the outer container 60). The opening portions 53 and 63 are hollow regions formed as a result of forming a container-shaped frame body by connecting the members of the base body 1, so that the members of the base body 1 are not disposed in the opening portions 53 and 63. Therefore, a plurality of joints between the members of the base body 1 are present in the opening portions 53 and 63. Therefore, it is preferable that the sealing reinforcement portions 2 be disposed at the edges 71 (corner portions) of the opening portions 53 and 63. Thus, an occurrence of a vacuum leak and a reduction in the sealing performance of the superconducting coil apparatus in the opening portions 53 and 63 can be reliably suppressed.

Figure 10:
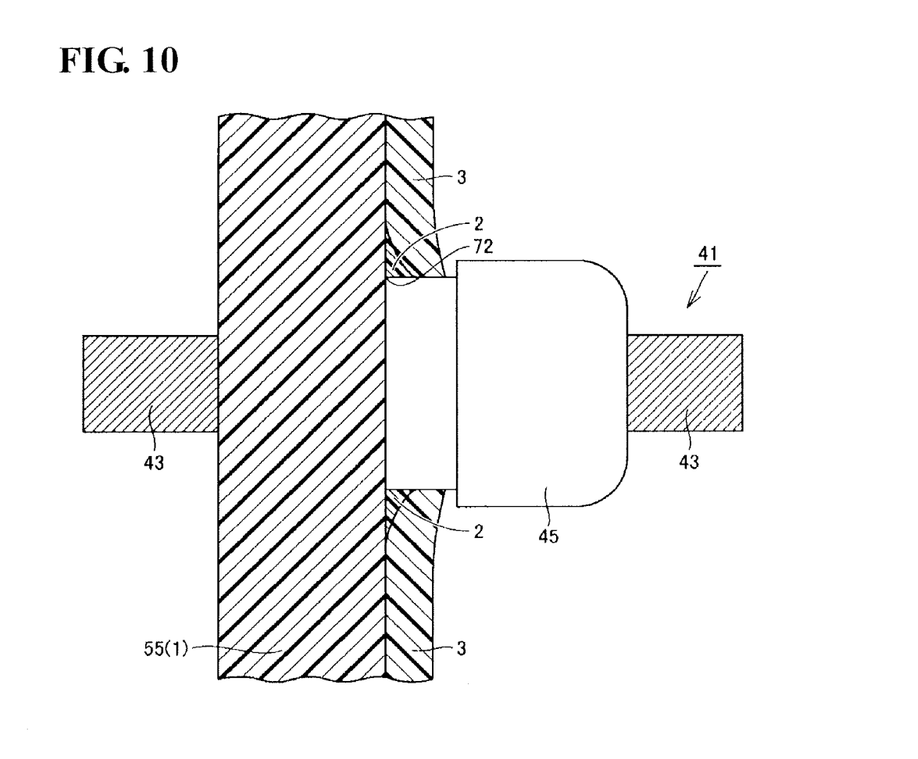
FIG. 10 is a schematic enlarged view of a region surrounded by a dotted circle "X" in FIG. 7.

FIG. 10 is an enlarged sectional view illustrating a region in which a terminal for supplying electric power to the superconducting coil 10 from the outside and for outputting electric power from the superconducting coil 10 is disposed so as to extend through the end housing 55 of the inner container 50. In FIG. 10, the left side of the end housing 55 is the inside of the inner container 50, and the right side of the end housing 55 is the outside of the inner container 50. Because the end housing 55 is a part of the inner container 50, the end housing 55 is also the base body 1, as with the inner container outer housing 51 illustrated in FIG. 8 and the like.

Among the members of the terminal 41, which extends through the base body 1, the terminal component 45 is disposed in a region that is outside the inner container 50 and that is nearest to the base body 1. The terminal component 45 serves to maintain, for example, the base body 1 and the terminal 41 to be fixed to each other.

As illustrated in FIG. 10, the reinforcing fiber 3 is disposed so as to cover the surface of the end housing 55 (base body 1), in other words, so as to closely contact the surface of the end housing 55 (base body 1). However, it often occurs that the reinforcing fiber 3 is not disposed so as to closely contact the corner 72, which is a corner portion at which the base body 1 and the terminal component 45 intersect, and a gap is formed between the base body 1 and the terminal component 45 as illustrated in FIG. 10. This is because, as described above, it is difficult for the reinforcing fiber 3 to be deformed so as to follow the angle of the corner 72, which is substantially a right angle. That is, as illustrated in FIG. 10, the reinforcing fiber 3 in the vicinity of the corner 72 is bent at a rounded angle as compared with the shape of the base body 1 at the edge 71. Therefore, a gap is easily formed between the curved portion of the reinforcing fiber 3 and the corner 72 of the base body 1.

It is preferable that the sealing reinforcement portion 2 be disposed so that the gap is filled therewith. Thus, as with the case of FIGS. 8 and 9 described above, a hole generated in a region (corner 72) in which the end housing 55 and the terminal 41 intersect is covered or filled with the sealing reinforcement portion 2, the performance of sealing the inside of the inner container 50 is increased. Moreover, even if a crack is generated in the base body 1 in the vicinity of the hole, the probability that the crack develops and causes a breakage failure of the inner container 50 is reduced because the crack is filled with the sealing reinforcement portion 2.

As described above and as illustrated in FIG. 10, the sealing reinforcement portion 2 is formed at a corner portion (corner 72) at the joint between a side surface of the inner container 50 (a wall portion such as the end housing 55) and the terminal 41, which extends through the side surface. Because this region has the joint between the base body 1 and the terminal 41 therein, it is preferable that the sealing reinforcement portion 2 be disposed at the corner 72 (corner portion) of the joint. Thus, an occurrence of a vacuum leak and a decline in the sealing performance of the superconducting coil apparatus at the corner 72 can be more reliably suppressed.

In FIGS. 5, 6, and 7, the terminal 41, the tubular members 57 and 58, and the outer tubes 67 and 68 are disposed so as to extend through the end housing 55. However, these members may be disposed so as to extend through the side surfaces of the inner container 50 and the outer container 60 (so as to extend through a hollow space, which is similar to the opening portions 53 and 63, extending through the side surfaces of the inner container 50 and the outer container 60).

Figure 11:
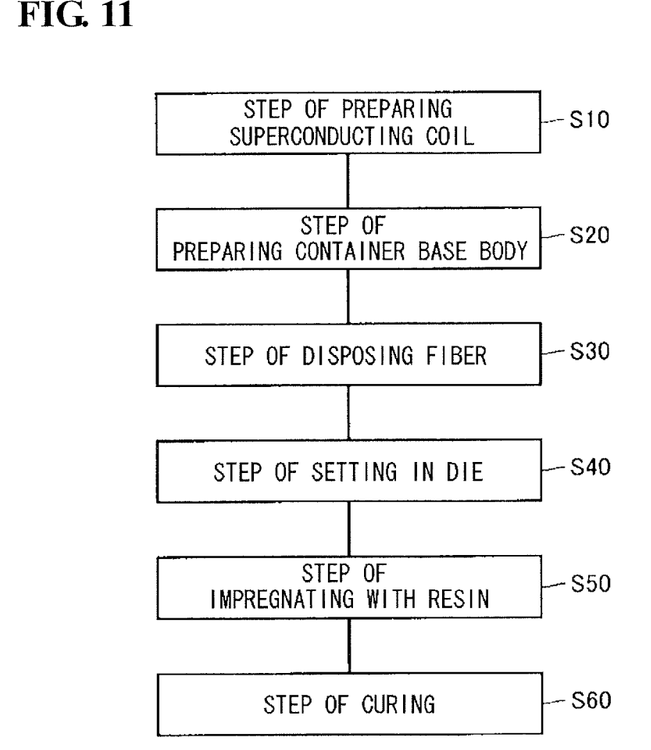
FIG. 11 is a flowchart illustrating the process of making a superconducting coil container according to an embodiment of the present invention.

Next, a method of making the superconducting coil apparatus described above will be described. As illustrated in the flowchart of FIG. 11, a step (S10) of preparing a superconducting coil is performed first. This is the step of forming the superconducting coil 10 described above.

The superconducting wire of the superconducting coil 10 has a tape-like shape, and may be a bismuth (Bi)-based superconducting wire or a thin-film superconducting wire. It is preferable that the superconducting wire be helically wound so as to form a saddle-shaped race track coil.

Next, a step (S20) of preparing a container base body is performed. This is the step of forming the base body 1, which is a frame body of the inner container 50 and the outer container 60. When forming the base body 1 of the inner container 50, it is preferable that the superconducting coil 10, which has been prepared in step (S10), be held inside the base body 1. When forming the base body 1 of the outer container 60, it is preferable that the outer container 60 be formed so as to cover the outer surface of the inner container 50.

It is preferable that the base body 1 of the inner container 50 and the outer container 60 be formed of members having high strengths and good heat insulating properties, such as members made of FRP. However, it is difficult to integrally form the inner container 50 and the outer container 60 by using a die or the like, because the inner container 50 and the outer container 60 have complex shapes. Therefore, it is preferable that the base body 1 be formed by preparing a plurality of members for forming the base body 1 and then joining the members together.

Next, a step (S30) of disposing fiber is performed. To be specific, this is the step of disposing a sheet-like member for forming the reinforcing fiber 3, which is a fiber member, so as to cover the outer periphery (outer surface) of the base body 1.

As the sheet-like member, for example, it is preferable that a fiber member made of a reinforcing material, such as a glass cloth or another glass fiber material included in the reinforcing fiber 3 or carbon fiber, be prepared. These materials serve as a reinforcing material that increases the strength of a resin with which the materials are impregnated. By placing the sheet-like member so as to closely contact the outer surface of the base body 1, the strength of the formed reinforcing fiber 3 is increased.

Here, it is preferable that the sheet-like member be disposed so as to closely contact the surface of the base body 1 and, for example, so as to contact the corner portion of the base body as closely as possible.

Next, as illustrated in FIG. 11, a step (S40) of setting in a die is performed. This is, to be specific, the step of setting the base body 1 in a die that is used for impregnating the inside of the sheet-like member, which has been disposed on the base body 1 in step (S30), with a resin.

Then, a step (S50) of impregnating the sheet-like member with a resin is performed. Here, a thermosetting resin, such as an epoxy resin or an unsaturated polyester resin, is poured into the die. Thus, the inside of the sheet-like member (fiber member), which covers the outer periphery of the base body 1 placed in the die, is impregnated with the thermosetting resin.

If a gap is formed, for example, between the base body 1 and the sheet-like member, the gap between the base body 1 and the sheet-like member is filled with the resin. In this state, a step (S60) of curing is performed. Here, to be specific, it is preferable that the base body 1 be heated in the die at a temperature in the range of 50 to 200° C. for a time in the range of 2 to 48 hours. Thus, the sheet-like member, which has been impregnated with the resin, is heat cured to form the reinforcing fiber 3 made of an FRP material, and the reinforcing fiber 3 is disposed so as to be integrated with the base body 1, whereby a container of the superconducting coil apparatus is formed. Therefore, the strength and the heat insulating properties of the inner container 50 and the outer container 60 are further increased.

At this time, the resin material, which has been disposed so that the gap between the base body 1 and the sheet-like member is filled therewith in step (S50), is formed in the heat processing in step (S60) as the sealing reinforcement portion 2 with which the space between the base body 1 and the sheet-like member (reinforcing fiber 3) is filled, as illustrated in FIGS. 9 and 10.

In the method of making the superconducting coil apparatus according to the present invention described above, when forming the reinforcing fiber 3 outside the base body 1, which forms the inner container 50 and the outer container 60, the sheet-like member composed of a fiber member included in the reinforcing fiber 3 is disposed first and then a resin material included in the reinforcing fiber 3 is supplied. Thus, even if a gap is formed between the base body and the sheet-like member when disposing the sheet-like member on the base body, the gap between the base body and the sheet-like member is filled with a resin material that is supplied later. Therefore, after being heat cured finally, the gap between the reinforcing fiber 3 and the base body 1 is filled with the sealing reinforcement portion 2, which is composed of a cured resin. That is, even if a gap is formed in a corner portion that is a joint between the members of the base body 1 or a corner portion that is a joint between the base body 1 and the terminal 41, the gap is filled with the sealing reinforcement portion 2, which is formed from a resin that is supplied (for impregnation) after the sheet-like member has been supplied, whereby the sealing performance of the containers of the superconducting coil apparatus to be formed can be improved.

When forming the reinforcing fiber 3, if, for example, heat curing is performed after disposing a sheet-like member that includes both the fiber material and the resin material of the reinforcing fiber 3 on the surface of the base body 1, a gap formed between the base body 1 and the sheet-like member remains as it is. Because it is unlikely that the resin material included in the sheet-like member seeps out to fill a gap between the base body 1 and the sheet-like member, the gap is formed in a region in which the contact between the base body 1 and the sheet-like member is insufficient. Therefore, if the gap is formed is a corner portion of the base body 1 and if the joint between the members is insufficient at the gap, it is highly likely that a reduction in the sealing performance of the container or a breakage failure of the container may occur due to the gap.

It should be understood that the embodiments described herein are exemplary in all respects and do not limit the present invention. The scope of the present invention is not indicated in the embodiments described above but is indicated in the claims, and is intended to include all modifications within the scope of the claims and the equivalents thereof.

INDUSTRIAL APPLICABILITY

The present invention is excellent as a technology for improving the sealing performance of a container that holds a superconducting coil of a superconducting apparatus.

REFERENCE SIGNS LIST 1 base body
2 sealing reinforcement portion
3 reinforcing fiber
10 superconducting coil,
13 rotor core
16 rotor shaft
17 coolant
18 output shaft
20 stator
21 gap
23 stator core
30 rotor
35 bearing
41 terminal
43 housing fixed terminal
45 terminal component
47 wire fixing terminal
50 inner container
51 inner container outer housing
52 inner container inner housing
53, 63 opening portion
54, 64 opening portion side surface
55, 56, 65, 66 end housing
57, 58 tubular member
60 outer container
61 outer container outer housing
62 outer container inner housing
67, 68 outer tube
71 edge
72 corner
100 superconducting motor

CITATION LIST

Patent Literature

PTL 1: Japanese Unexamined Patent Application Publication No. 2007-35835

The invention claimed is:
1. A superconducting coil apparatus comprising:
a superconducting coil; and
a container that holds the superconducting coil therein,
wherein the container is made of FRP, and
wherein a sealing reinforcement portion is formed at a corner portion of the container, the sealing reinforcement portion extending along the corner portion and being made of a resin.

2. The superconducting coil apparatus according to claim 1, wherein a reinforcing fiber layer is further provided outside the sealing reinforcement portion at the corner portion of the container.

3. The superconducting coil apparatus according to claim 1, wherein an opening portion is formed in a side surface of the container, and
wherein the sealing reinforcement portion is disposed at the corner portion of the opening portion.

4. The superconducting coil apparatus according to claim 1, further comprising a terminal disposed so as to extend through a wall portion of the container, wherein the sealing reinforcement portion is disposed at the corner portion of a joint between the wall portion of the container and the terminal.

5. A superconducting apparatus comprising the superconducting coil apparatus according to claim 1.

6. A method of making the superconducting coil apparatus according to claim 1, comprising:
a step of preparing the superconducting coil;
a step of preparing a base body of the container that holds the superconducting coil therein;
a step of disposing a fiber member so as to cover an outer periphery of the base body;
a step of impregnating the fiber member disposed around the outer periphery of the base body with a resin; and
a step of forming the container by curing the fiber member.

7. The superconducting coil apparatus according to claim 2, wherein an opening portion is formed in a side surface of the container, and
wherein the sealing reinforcement portion is disposed at the corner portion of the opening portion.

8. The superconducting coil apparatus according to claim 2, further comprising a terminal disposed so as to extend through a wall portion of the container, wherein the sealing reinforcement portion is disposed at the corner portion of a joint between the wall portion of the container and the terminal.

9. The superconducting coil apparatus according to claim 3, further comprising a terminal disposed so as to extend through a wall portion of the container, wherein the sealing reinforcement portion is disposed at the corner portion of a joint between the wall portion of the container and the terminal.

10. The superconducting coil apparatus according to claim 7, further comprising a terminal disposed so as to extend through a wall portion of the container, wherein the sealing reinforcement portion is disposed at the corner portion of a joint between the wall portion of the container and the terminal.

* * * * *